United States Patent [19]
Frye et al.

[11] Patent Number: 5,984,077
[45] Date of Patent: Nov. 16, 1999

[54] NON-CONDUCTIVE OVERHEAD CONVEYOR

[75] Inventors: Robert L. Frye, Saluda, S.C.; Beacher R. Webb, Jr., Waynesville, Ohio

[73] Assignee: High Reach Conveyors, Inc., Clearfield, Utah

[21] Appl. No.: 08/821,650

[22] Filed: Mar. 20, 1997

Related U.S. Application Data

[63] Continuation-in-part of application No. 08/449,864, Jul. 10, 1995, Pat. No. 5,685,687.

[51] Int. Cl.$^6$ ...................................................... B60P 1/36
[52] U.S. Cl. .......................... 198/317; 198/318; 198/699; 198/844.1; 198/861.4; 414/505
[58] Field of Search .................................... 198/313, 315, 198/316.1, 317, 861.4, 318, 699, 844.1, 698, 699.1, 832; 414/501, 505, 528, 23

[56] References Cited

U.S. PATENT DOCUMENTS

| | | | |
|---|---|---|---|
| 394,666 | 12/1888 | Stephan | 198/317 X |
| 400,798 | 4/1889 | Russell | 198/317 X |
| 409,398 | 8/1889 | Gaumer | 198/317 X |
| 675,000 | 5/1901 | Dennis | 198/699 |
| 2,005,442 | 6/1935 | Spiegl | 198/317 |
| 5,498,119 | 3/1996 | Faivre | 198/317 X |

FOREIGN PATENT DOCUMENTS

| | | | |
|---|---|---|---|
| 203109 | 8/1989 | Japan | 198/844.1 |
| 847459 | 9/1960 | United Kingdom | 198/844.1 |

*Primary Examiner*—Frank E. Werner
*Attorney, Agent, or Firm*—Workman, Nydegger & Seeley

[57] ABSTRACT

This invention relates particularly to overhead conveyors as are used to deliver, or in some cases to remove, materials from high places such as roof tops. In particular, the invention applies to such conveyors which are mobile, i.e. vehicle mounted, and may be part of a delivery truck for transporting materials such as roofing shingles. The truck is driven into a site where roofing or the like is to be applied or repaired, and the conveyor is positioned as to its elevation and azimuth using its own power drive equipment.

12 Claims, 5 Drawing Sheets

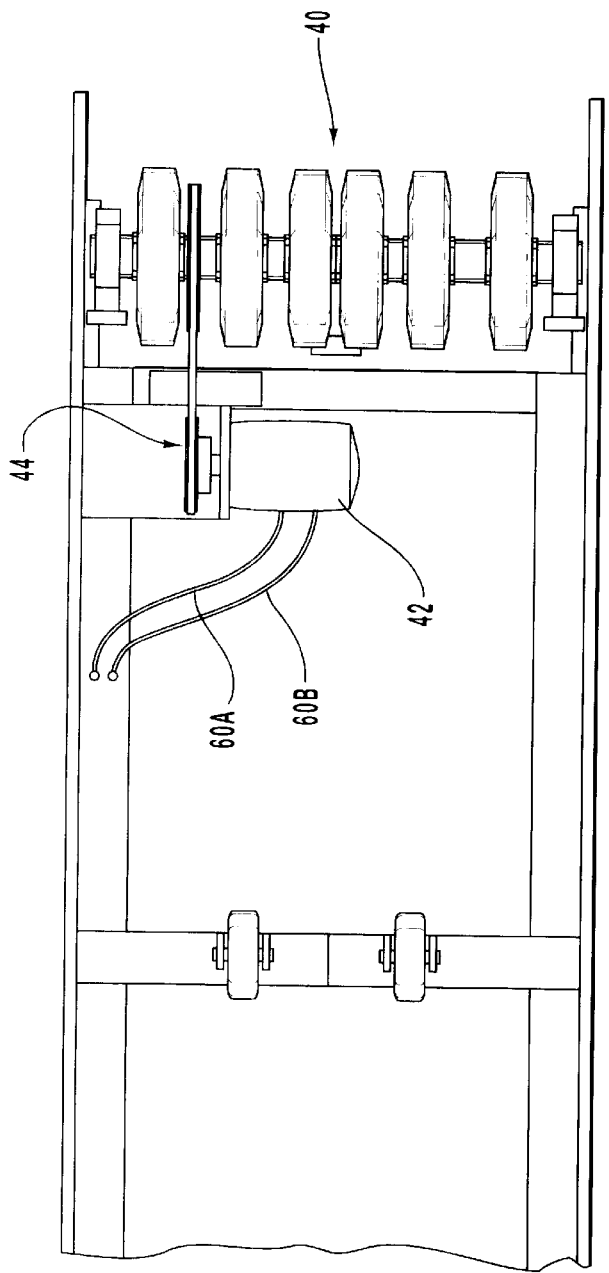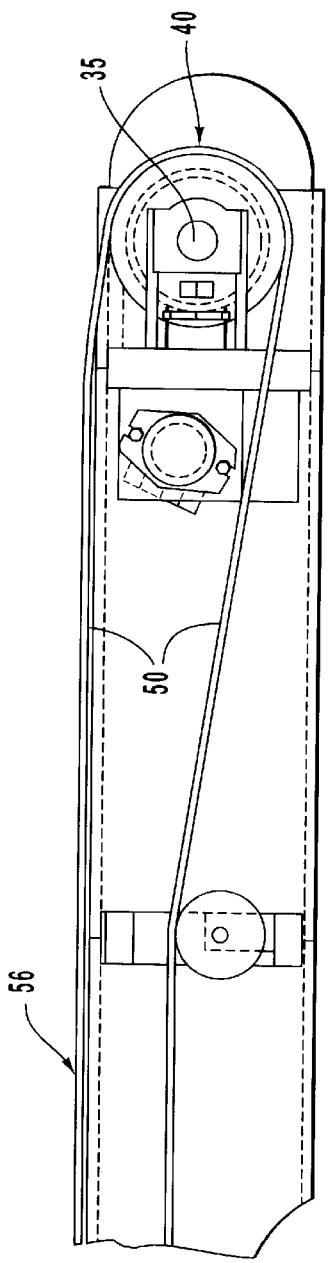
FIG. 4
FIG. 5

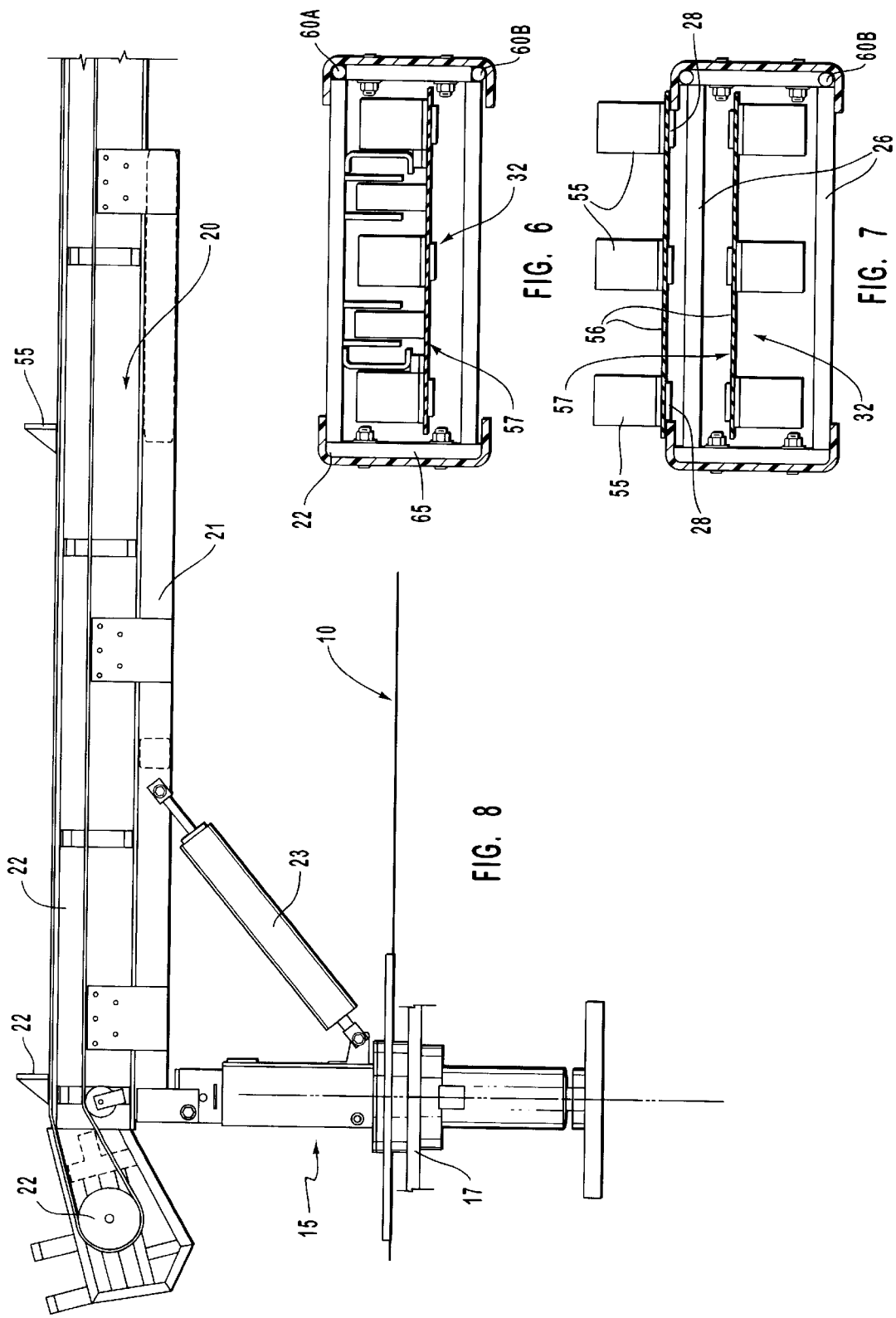

NON-CONDUCTIVE OVERHEAD CONVEYOR

CROSS-REFERENCE TO RELATED APPLICATION

This application is a continuation-in-part of U.S. application Ser. No. 08/449,864, filed Jul. 10, 1995, now U.S. Pat. No. 5,685,687.

FIELD OF THE INVENTION

This invention relates to boom type conveyors need to deliver packages or materials onto roofs or other elevated locations.

BACKGROUND OF THE INVENTION

This invention relates particularly to overhead conveyors as are used to deliver, or in some cases to remove, materials from high places such as roof tops. In particular, the invention applies to such conveyors which are mobile, i.e. vehicle mounted, and may be part of a delivery truck for transporting materials such as roofing shingles. The truck is driven into a site where roofing or the like is to be applied or repaired, and the conveyor is positioned as to its elevation and azimuth using its own power drive equipment.

A major problem with such conveyor systems is the danger presented by nearby overhead electrical wires, which often are high tension lines in which the applied voltage may be anywhere from several kilovolts to several megavolts. Major accidents, with loss of life and/or severe injuries to operating personnel and destruction of equipment, occur when a metal overhead conveyor structure (e.g. boom) momentarily contacts this wiring.

Step ladders or extension ladders constructed of electrically non-conductive parts are available to workmen in lengths up to about 24 feet, but those are intended only for climbing and possibly carrying of small equipment or supplies, up to about 50 pounds in weight.

Heavy duty equipment, such as the mobile overhead conveyor systems, has traditionally been constructed of metal, and thus such equipment is highly susceptible to overhead wire accidents. Some of these accidents are so severe that the conveyor and its supporting truck is destroyed, with some of the heavy structural members being partially melted or distorted. The released electrical energy has been known to jump to adjacent vehicles and destroy or damage them also. Of course, any person in contact with this equipment at the time is subjected to a high electrical discharge, and if the person is fortunate enough to survive he is usually severely injured.

To minimize this type of accident, there is a need for electrically non-conductive overhead conveyor equipment which is robust enough to withstand heavy usage and large forces.

SUMMARY OF THE INVENTION

The present invention provides heavy duty overhead portable conveying equipment which is electrically non-conductive, to the extent of being capable, when ground based, of withstanding contact with kilovolt power lines and not providing an accidental grounding path. The conveyor is provided with a non-conductive boom which includes a boom frame made of reinforced fiberglass beams and/or trusses, driving and idler drums at opposite ends of the boom frame, a fluid power (preferably hydraulic) drive motor coupled to the driving drum, non-conductive hose forming the supply and return of pressurized fluid for the motor, and a non-conductive belt, as of polypropylene, passing around the drums and guided by plastic guide strips.

The principal object of the invention is to provide a mobile power driven conveyor for moving packages to and from various elevated locations, wherein the conveyor is so constructed that it has an essentially electrically non-conductive boom member, including a power driven conveyor belt, to offer protection against accidental contact of the boom member with electrical lines.

Other objects and advantages of the invention will be apparent from the following description, the accompanying drawings and the appended claims.

BRIEF DESCRIPTION OF THE DRAWINGS

FIGS. 4 and 5 are enlarged top and side views showing the drive and drive rollers, and the belt return guides;

FIGS. 6 and 7 are cross-section views through the boom, taken along lines 6—6 and 7—7 in FIG. 2;

FIG. 8 is an enlarged side view of the lower end of the boom and its supporting structure, for mounting on a track bed;

DESCRIPTION OF THE PREFERRED EMBODIMENT

Figure 1:
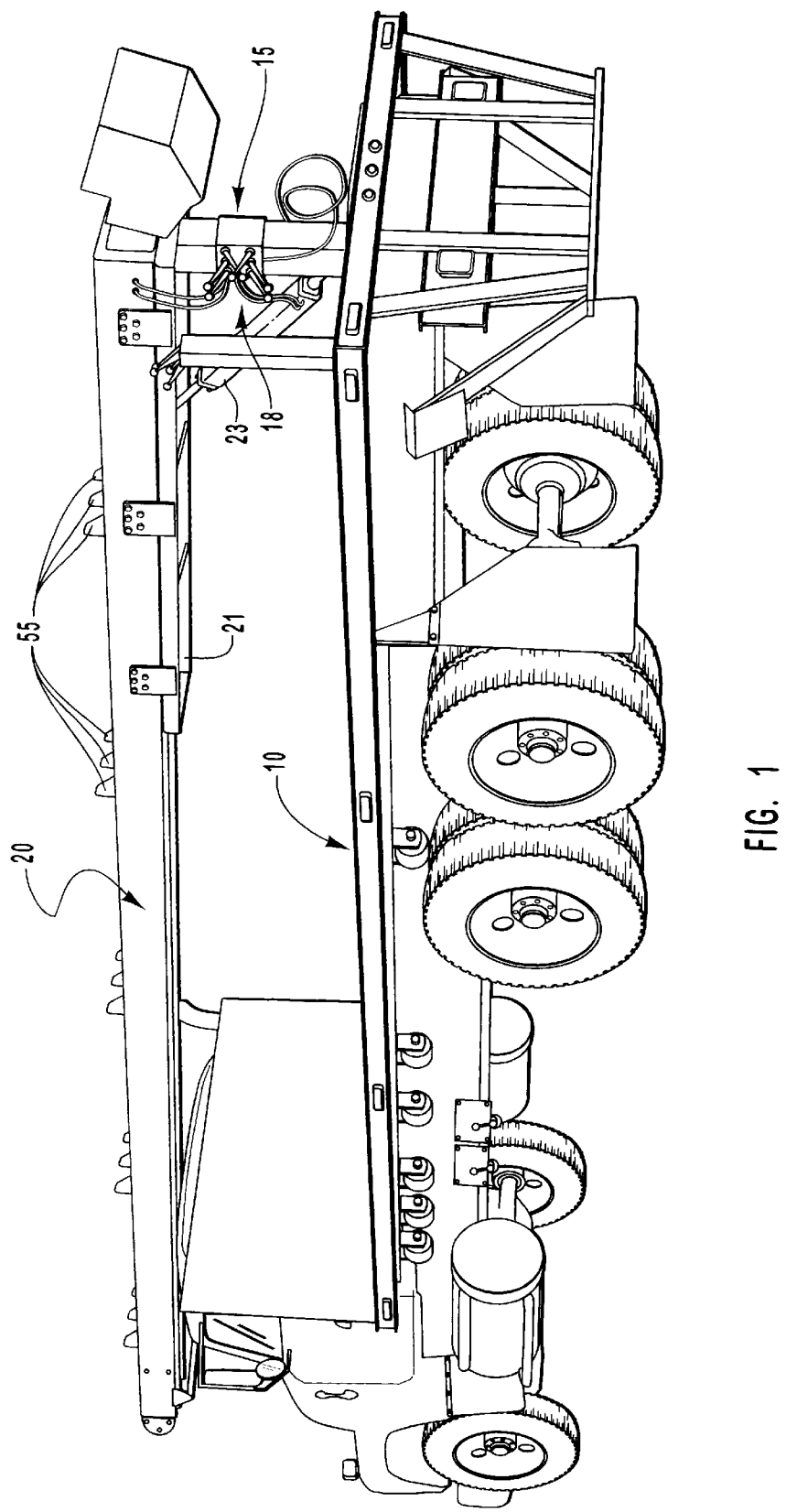
FIG. 1 is a perspective view of a flat bed truck fitted with a conveyor provided by the invention.
Figure 2:
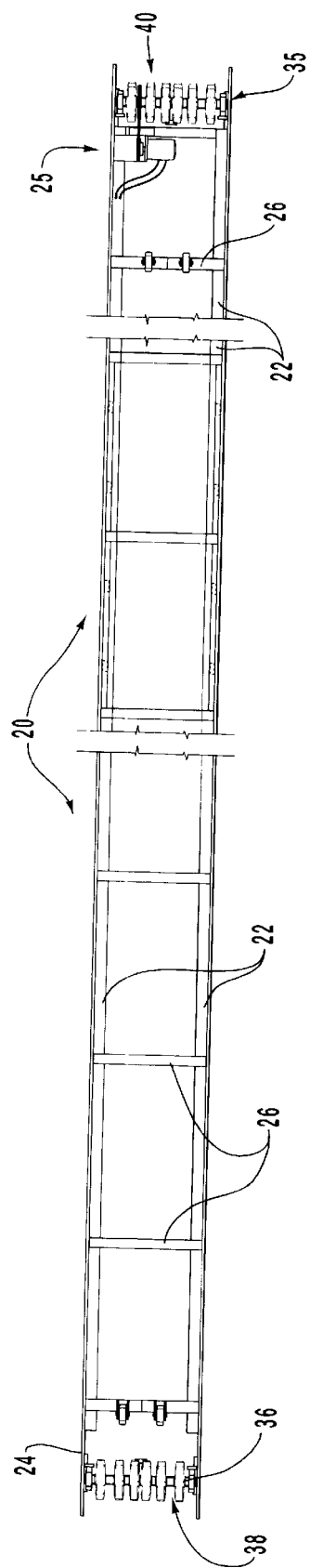
FIG. 2 is a schematic side view showing the truck bed location with the boom lowered, the boom structure being shown broken and shortened.
Figure 3:
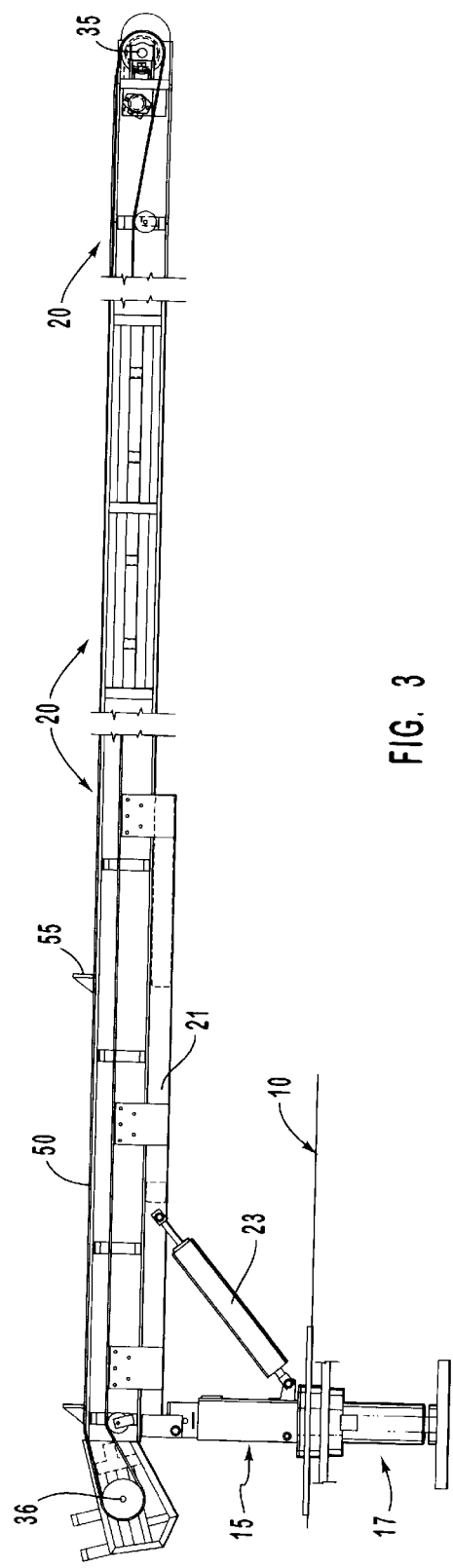
FIG. 3 is a top view of the boom structure as seen in FIGS. 1 and 2.

Referring to FIGS. 1, 2 and 3, which are overall views of the novel overhead conveyor mounted on a transport flat bed truck, the truck has a bed 10 for supporting loads, such as pallet loads of roofing shingle packages, and which is fitted with a turret 15 at the rear of truck bed 10. Turret 15 includes a rotatable base 17 for the conveyor boom 20. Adjacent to turret 15 is a control console 18, (FIG. 1) from which various hydraulic motors are controlled to raise and lower the boom, i.e. change its angle with respect to base 17, and to move the boom from side to side of the truck bed, by rotating turret 15. The discharge conveyor, normally used for off-loading of packages, has an elongated boom 20, as later described, supporting the upper and lower shafts 35, 36 of an endless conveying belt 50, which has lugs or plates 55 fitted crosswise to belt 50, so as to support packages rested on the belt while it is driven to move the packages upward along the boom.

As explained in the related application, a pair of telescoping tubes form the support for boom 20, the upper tube having a pivot connection to the boom structure. A roller bearing provides rotational support for the vertical tubes along with a lower thrust bearing at the bottom of the lower tube.

The upper one of the telescopic tubes has a pivot connection to a support cradle 21 which is attached to the rails of the boom structure. An azimuth control hydraulic cylinder 23 is attached between cradle 21 and the upper support tube.

The main elongated boom structure 20 includes side rails 22 having first (lower) ends 24 and second (upper) ends 25.

The rails 22 are constructed of fiberglass reinforced plastic material, which has a high electrical dielectric value, sufficient so as not to break down under application of electrical potentials of one kilovolt or more, such as are encountered in overhead electrical power transmission lines. Cross members 26, which may be of fiberglass or of steel or other structural metal extend between and are secured to side rails 22, 24 at predetermined intervals, preferably spaced apart about three feet.

Stringer members 28 are secured along the tops of cross members 26. The stringer members preferably are fiberglass reinforced plastic beams having a shallow C-shaped cross-section (FIG. 7), those stringers located adjacent side rails 22 being positioned facing inward (downward) of the boom structure, and the central stringer member (of which there can be more than one) being positioned facing outward (upward) of the boom. The upward facing parts of stringer members 28 cooperate with the tops of side rails 22 to form a support over which a conveyor belt can move.

Each of cross members 26 is thus electrically isolated (if made of metal), there being a gap between them of approximately three feet or more sufficient to avoid breach of the gap between the cross members by an imposed high voltage. The side rails and cross members provide a top portion 30 of boom structure 20, and a passage 32 internal of the boom structure. Belt return guides 29 are fastened to the insides of rails 22, facing inward of the interior of the boom structure.

Upper and lower cross shafts 35 and 36 are rotatably mounted between side rails 22, 24 adjacent the lower and upper ends thereof. A first roller assembly 38 is carried on lower cross shaft 36, and either roller assembly 38 or shaft 36 is freely rotatable, thus functioning as an idler drum. A second roller assembly 40 is fixed to cross shaft 35, and is driven by a fluid power (hydraulic) motor 42, via a chain and sprocket drive 44.

A conveyor belt 50 of electrically non-conductive material, such as polypropylene, extends along the boom structure 20 and about roller assemblies 38, 40 forming an upper conveying flight 56 along the top portion of boom structure 20, and a return flight 57 through passage 32. It should be understood that rubber type (synthetic or natural) belt materials are not satisfactory due to the carbon content of such belting which does not present the necessary resistivity to high voltage potentials. The conveyor lugs 55 are secured across belt 50 at spaced intervals, as seen in the drawings, to assist in moving materials, such a shingle packages, upward to the top of boom structure 20. Since lugs 55 are spaced apart along belt 50 by a considerable distance (e.g. six feet) there is a substantial dielectric gap between successive lugs, so they can be made of metal or a reinforced plastic material.

The means for driving belt 50 to move upper flight 56 in the desired direction along the boom structure 20 is provided by hydraulic motor 42, which is preferably reversible so the conveyor could be used for down-loading if desired. Supply and return of fluid under pressure to motor 42 is provided via hoses 60A, 60B (FIGS. 4, 5, and 6) which are also of non-conductive materials. The hoses are arranged within a one side of passage 32 within the cross-section of boom structure 20. A typical control circuit is disclosed in the aforementioned related patent application.

Figure 9:
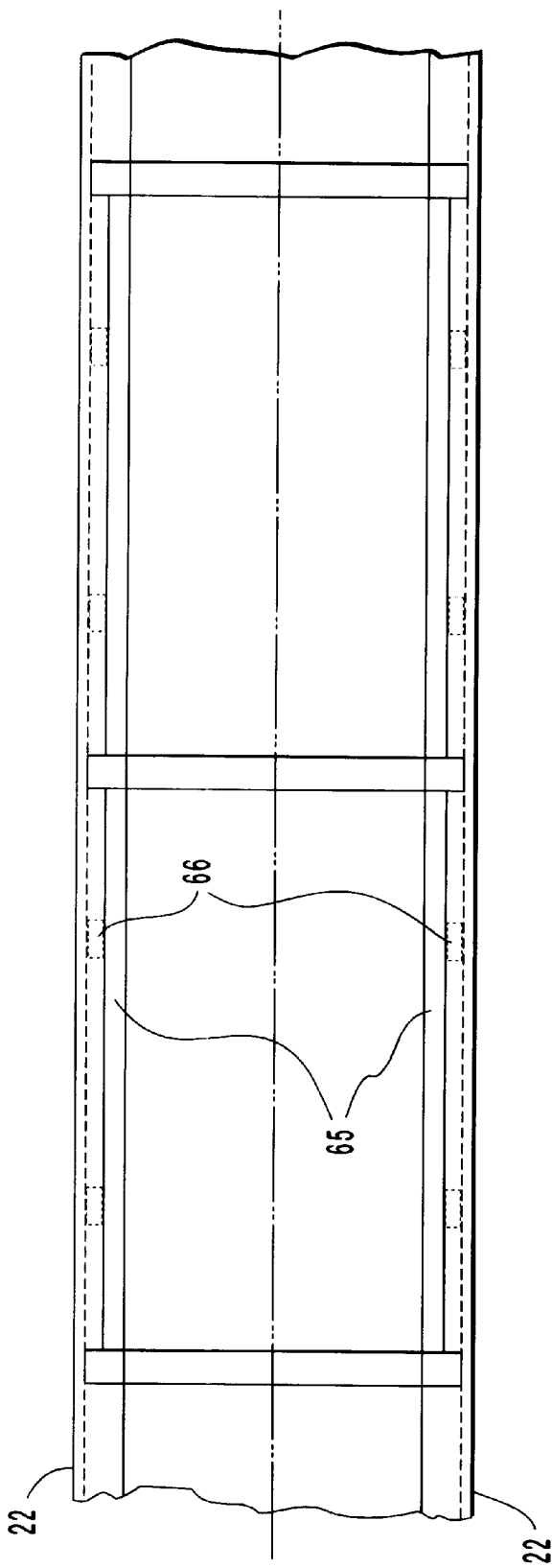
FIG. 9 is an enlarged segmental view of the boom showing reinforcements to resisting twisting lengthwise of the boom.
Figure 10:
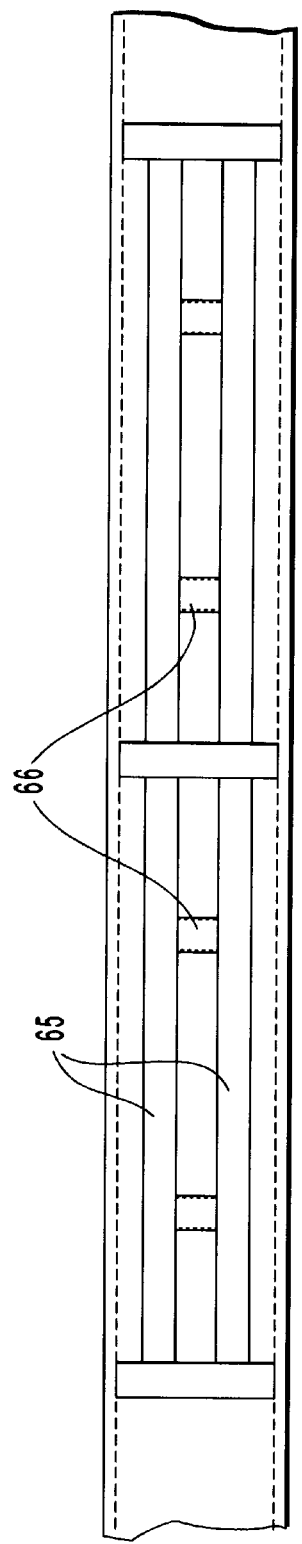
FIG. 10 is a segmental side view of the reinforcements.

The boom structure can be supplied in various lengths. To minimize twisting about the longitudinal axis of the boom, a section of a stiff box-like member is provided within the middle of the boom structure, as can in FIGS. 9 and 10. This section comprises four longitudinal tubes or beams 65 welded to cross pieces 66, the whole box-like structure being incorporated within the boom structure 20, as shown.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A mobile power driven conveyor for moving packages or other objects to and from various elevated locations, comprising:

a main elongated boom structure including side rails having first and second ends, said side rails being formed of an electrically non-conductive material in order to resist damage to the conveyor if contacted by an electrical potential;

cross members extending between and secured to said side rails at predetermined intervals, said side rails and cross members defining a top portion and a bottom portion of said boom structure and an internal passage of said boom structure;

cross shafts rotatably mounted between said side rails adjacent said ends therefore;

first and second sets of rollers carried on said cross shafts, respectively;

a conveyor belt comprised of an electrically non-conductive material in order to resist damage to the conveyor if contacted by the electrical potential, said conveyor belt extending along said boom structure and about said rollers in order to form an upper conveying flight along the top portion of said boom and a return flight through said internal passage;

conveyor lugs secured across said conveyor belt at spaced intervals;

means for driving said conveyor belt to move said flights along said boom, wherein the packages or other objects placed on said conveyor belt can be moved to and from various locations by selective movement of said flights of said conveyor belt; and a supporting mount secured to said boom adjacent said first ends of said side rails, said supporting mount being configured so as to provide means for raising and lowering said boom and means for swinging said boom from side to side about said mount.

2. A mobile power driven conveyor as defined in claim 1, wherein the side rails comprise fiberglass reinforced structural plastic beams.

3. A mobile power driven conveyor as defined in claim 1, wherein the conveyor belt comprises polypropylene.

4. A mobile power driven conveyor as defined in claim 1, wherein said means for driving said conveyor belt comprises a hydraulic motor, wherein hoses of a non-conductive material provide supply and return of hydraulic fluid to said hydraulic motor.

5. A mobile power driven conveyor for moving packages or other objects to and from various elevated locations, comprising:

a main elongated boom structure including side rails comprised of a filament reinforced electrically non-conductive material in order to resist damage to the conveyor if subjected to an electrical potential, each of said side rails having an upper end and a lower end;

cross members extending between and secured to said side rails at predetermined intervals, said side rails and cross members defining a top portion and a bottom portion of said boom structure and an internal passage of said boom structure;

lower and upper cross shafts rotatably mounted between said side rails adjacent said respective lower and upper ends thereof;

first and second sets of rollers carried on said cross shafts, respectively, said set of rollers at said upper end being secured to the shaft;

a conveyor belt of an electrically non-conductive material such as polypropylene in order to resist damage to the conveyor if subjected to the electrical potential, said conveyor belt extending along said boom structure and about said rollers in order to form an upper conveying flight along the top portion of said boom and a return flight through said internal passage;

conveyor lugs secured across said belt at spaced intervals;

means for driving said upper shaft to move said flights of said conveyor belt along said boom structure, wherein the packages or other objects placed on said conveyor belt can be moved to and from various locations by selective movement of said flights of said conveyor belt; and a supporting mount secured to said boom structure adjacent said lower ends of said side rails, said mount being configured so as to provide means for raising and lowering said boom structure and means for swinging said boom structure from side to side about said supporting mount.

6. A mobile power driven conveyor as defined in claim 5, wherein said means for driving said upper shaft comprises a hydraulic motor supported in said upper end of said boom structure, wherein hoses of a non-conductive material extending internally of said boom structure provide supply and return of hydraulic fluid to said motor.

7. A mobile power driven conveyor for transporting packages or other objects to selected positions along the conveyor, comprising:

an elongated boom structure including:
    side rails having first and second ends and being formed of an electrically non-conductive plastic material in order to resist damage to the conveyor if contacted by an electrical potential;
    cross members extending between and secured to said side rails at predetermined intervals;
    a plurality of rollers rotatably attached between said side rails;
    a conveyor belt comprised of an electrically non-conductive material in order to resist damage to the conveyor if contacted by the electrical potential, said conveyor belt extending along at least a portion of said boom structure and about said rollers in order to provide means for moving the packages or other objects to selected locations along said boom structure;

means for selectively driving said conveyor belt in order to move the packages or other objects to selected locations along said boom structure; and a supporting mount secured to said boom structure adjacent said first ends of said side rails, said supporting mount being configured so as to provide means for raising and lowering said boom structure and means for swinging said boom structure from side to side about said supporting mount.

8. A mobile power driven conveyor as defined in claim 7, wherein said side rails comprise fiberglass reinforced structural plastic beams.

9. A mobile power driven conveyor as defined in claim 7, wherein said conveyor belt comprises polypropylene.

10. A mobile power driven conveyor as defined in claim 7, wherein said means for driving said conveyor belt comprises a hydraulic motor.

11. A mobile power driven conveyor as defined in claim 10, wherein hoses of a non-conductive material provides supply and return of hydraulic fluid to said hydraulic motor.

12. A mobile power driven conveyor as defined in claim 7, wherein said plurality of rollers are rotatably attached to said side rails by means of cross shafts rotatably mounted between said side rails.

* * * * *

(12) EX PARTE REEXAMINATION CERTIFICATE (5430th)
United States Patent
Frye et al.

(10) Number: US 5,984,077 C1
(45) Certificate Issued: Jun. 27, 2006

(54) NON-CONDUCTIVE OVERHEAD CONVEYOR

(75) Inventors: Robert L. Frye, Saluda, SC (US); Beacher R. Webb, Jr., Waynesville, OH (US)

(73) Assignee: High Reach Conveyors, Inc., Clearfield, UT (US)

Reexamination Request:
 No. 90/006,476, Dec. 3, 2002

Reexamination Certificate for:
 Patent No.: 5,984,077
 Issued: Nov. 16, 1999
 Appl. No.: 08/821,650
 Filed: Mar. 20, 1997

Related U.S. Application Data

(63) Continuation-in-part of application No. 08/499,864, filed on Jul. 10, 1995, now Pat. No. 5,685,687.

(51) Int. Cl.
 *B60P 1/36* (2006.01)

(52) U.S. Cl. ............ 198/317; 198/318; 198/699; 198/844.1; 198/861.4; 414/505

(58) Field of Classification Search ............ 198/313, 198/315, 316.1, 317, 318, 698, 699, 699.1, 198/832, 844.1, 861.4; 414/23, 501, 505, 414/528
 See application file for complete search history.

(56) References Cited

U.S. PATENT DOCUMENTS

| | | |
|---|---|---|
| 3,598,224 A | 8/1971 | Oury Elmhurst, III |
| 3,997,695 A | 12/1976 | Gitt et al. |
| 4,411,070 A | 10/1983 | Boyum et al. |
| 4,475,625 A | 10/1984 | Clements |
| 4,609,097 A | 9/1986 | Dos Santos |
| 4,923,359 A | 5/1990 | Petri et al. |
| 5,392,698 A * | 2/1995 | Sprecher et al. ............ 198/853 |

* cited by examiner

*Primary Examiner*—Patrick Mackey

(57) ABSTRACT

This invention relates particularly to overhead conveyors as are used to deliver, or in some cases to remove, materials from high places such as roof tops. In particular, the invention applies to such conveyors which are mobile, i.e. vehicle mounted, and may be part of a delivery truck for transporting materials such as roofing shingles. The truck is driven into a site where roofing or the like is to be applied or repaired, and the conveyor is positioned as to its elevation and azimuth using its own power drive equipment.

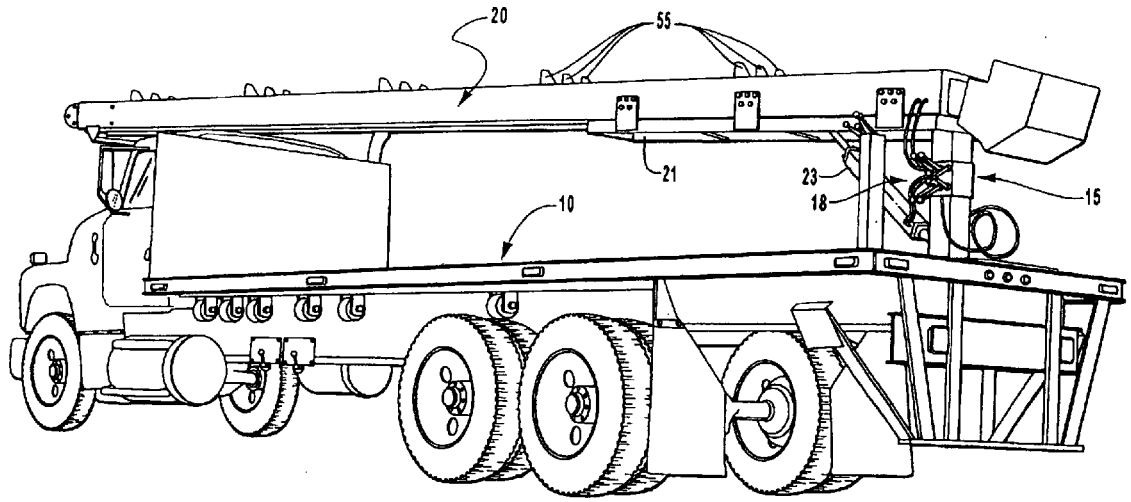

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5 and 7 are determined to be patentable as amended.

Claims 2–4, 6 and 8–12, dependent on an amended claim, are determined to be patentable.

New claims 13–25 are added and determined to be patentable.

1. A mobile power driven conveyor for moving packages or other objects to and from various elevated locations, comprising:
    a main elongated boom structure including side rails having first and second ends, said side rails having first and second ends, said side rails being formed of an electrically non-conductive material in order to resist damage to the conveyor if contacted by an electrical potential;
    cross members extending between and secured to said side rails at predetermined intervals, said side rails and cross members defining a top portion and a bottom portion of said boom structure and an internal passage of said boom structure;
    cross shafts rotatably mounted between said side rails adjacent said ends therefore;
    first and second sets of rollers carried on said cross shafts, respectively;
    a conveyor belt comprised of an electrically non-conductive material in order to resist damage to the conveyor if contacted by the electrical potential, said conveyor belt extending along said boom structure and about said rollers in order to form an upper conveying flight along the top portion of said boom and a return flight through said internal passage;
    conveyor lugs secured across said conveyor belt at spaced intervals;
    means for driving said conveyor belt to move said flights along said boom, wherein the packages or other objects placed on said conveyor belt can be moved to and from various locations by selective movement of said flights of said conveyor belt; and
    a supporting mount secured to said boom adjacent said first ends of said side rails, said supporting mount being configured so as to provide means for raising and lowering said boom and means for swinging said boom from side to about said mount, *said supporting mount being capable of selectively raising said boom structure up to and including a height at least as high as a power line.*

5. A mobile power driven conveyor for moving packages or other objects to and from various elevated locations, comprising:
    a main elongated bottom structure including side rails comprised of a filament reinforced electrically non-conductive material in order to resist damage to the conveyor if subjected by an electrical potential, each of said side rails having an upper end and a lower end;
    cross members extending between and secured to said side rails at predetermined intervals, said side rails and cross members defining a top portion and a bottom portion of said boom structure and an internal passage of said boom structure;
    lower and upper cross shafts rotatably mounted between said side rails adjacent said respective lower and upper ends thereof;
    first and second sets of rollers carried on said cross shafts, respectively, said set of rollers at said upper end being secured to the shaft;
    a conveyor belt of an electrically non-conductive material such as polypropylene in order to resist damage to the conveyor if subjected to the electrical potential, said conveyor belt extending along said boom structure and about said rollers in order to form an upper conveying flight along the top portion of said boom and a return flight through said internal passage;
    conveyor lugs secured across said belt at spaced intervals;
    means for driving said upper shaft to move said flights of said conveyor belt along said boom, wherein the packages or other objects placed on said conveyor belt can be moved to and from various locations by selective movement of said flights of said conveyor belt; and
    a supporting mount secured to said boom structure adjacent said lower ends of said side rails, said mount being configured so as to provide means for raising and lowering said boom structure and means for swinging said boom structure from side to side about said supporting mount, *said supporting mount being capable of selectively raising said boom structure up to and including a height at least as high as a power line.*

7. A mobile power driven conveyor for transporting packages or other objects to selected positions along the conveyor, comprising:
    an elongated boom structure including:
        side rails having first and second ends and being formed of an electrically non-conductive plastic material in order to resist damage to the conveyor if contacted by an electrical potential;
        cross members extending between and secured to said side rails at predetermined intervals;
        a plurality of rollers rotatably attached between said side rails;
        a conveyor belt comprised of an electrically non-conductive material in order to resist damage to the conveyor if contacted by the electrical potential, said conveyor belt extending along at least a portion of said boom structure and about said rollers in order to provide means for moving the packages or other objects to selected locations along said boom structure;
    means for selectively driving said conveyor belt in order to move the packages or other objects to selected locations along said boom structure; and
    a supporting mount secured to said boom structure adjacent said first ends of said side rails, said supporting mount being configured so as to provide means for raising and lowering said boom structure and means for swinging said boom structure from side to side about said supporting mount, *said supporting mount being capable of selectively raising said boom structure up to and including a height at least as high as a power line.*

13. A mobile power driven conveyor as defined in claim 7, further comprising conveyor lugs secured across said belt at spaced intervals.

14. A mobile power driven overhead conveyor as defined in claim 7, further comprising a flat-bed truck to which said boom structure is mounted.

15. A mobile power driven overhead conveyor as defined in claim 14, said flat-bed truck including a bed disposed at least partially beneath said bottom structure upon which packages or other objects can be placed for transport by said flat-bed truck.

16. A mobile power driven conveyor for transporting packages or other objects to selected positions along the conveyor, comprising:

an elongated boom structure including:
  side rails having first and second ends and being formed of an electrically non-conductive plastic material in order to resist damage to the conveyor if contacted by an electrical potential; and
  cross members extending between and secured to said side rails at predetermined intervals;
a plurality of rollers rotatably attached between said side rails;
a conveyor belt comprised of an electrically non-conductive material in order to resist damage to the conveyor if contacted by the electrical potential, said conveyor belt extending along at least a portion of said boom structure and about said rollers in order to provide means for moving the packages or other objects to selected locations along said boom structure;
conveyor lugs secured across said conveyor belt at spaced intervals;
means for selectively driving said conveyor belt in order to move the packages or other objects to and from selected locations along said boom structure; and
a supporting mount secured to said boom structure adjacent said first ends of said side rails, said supporting mount being configured so as to provide means for raising and lowering said boom structure and means for swinging said boom structure from side to side about said supporting mount, said supporting mount being capable of selectively raising said boom structure up to and including a height at least as high as a power line.

17. A mobile power driven overhead conveyor as defined in claim 16, futher comprising a flat-bed truck to which said boom structure is mounted.

18. A mobile power driven overhead conveyor for selectively transporting packages or other objects to or from high places along the overhead conveyor, comprising:

an elongated boom structure including:
  side rails having first and second ends and being formed of an electrically non-conductive plastic material in order to resist damage to the conveyor if contacted by an electrical potential; and
  cross members extending between and secured to said side rails at predetermined intervals;
a plurality of rollers rotatably attached between said side rails;
a conveyor belt comprised of an electrically non-conductive material in order to resist damage to the conveyor if contacted by the electrical potential, said conveyor belt extending along at least a portion of said boom structure and about said rollers in order to provide means for moving the packages or other objects to selected locations along said boom structure;
means for selectively driving said conveyor belt in order to move the packages or other objects to selected locations along said boom structure; and
a supporting mount secured to said boom structure adjacent said first ends of said side rails, said supporting mount being configured so as to provide means for raising and lowering said boom structure and means for swinging said boom structure from side to side about said supporting mount, *said supporting mount being capable of selectively raising said boom structure up to and including a height at least as high as an overhead power line.*

19. A mobile power driven overhead conveyor as defined in claim 18, said supporting mount being capable of selectively raising said boom structure up to and including a height at least as high as a roof top.

20. A mobile power driven overhead conveyor as defined in claim 18, further comprising a truck to which said boom structure is mounted.

21. A mobile power driven overhead conveyor as defined in claim 20, wherein said truck is a flat-bed truck.

22. A mobile power driven overhead conveyor as defined in claim 21, said flat-bed truck including a bed disposed at least partially beneath said boom structure upon which packages or other objects can be placed for transport by said flat-bed truck.

23. A mobile power driven overhead conveyor as defined in claim 18, at least an end of said boom structure adjacent to said bed of said truck being unobstructed so as to facilitate placement of packages on, or removal of packages from, said conveyor belt.

24. A mobile power driven overhead conveyor as defined in claim 18, further comprising a plurality of stringer members disposed on said cross members so as to form a support over which said conveyor belt can move.

25. A mobile power driven overhead conveyor as defined in claim 24, said stringer members having a shallow C-shaped cross-section.

\* \* \* \* \*